March 31, 1953 L. C. HESTER 2,633,066
TWO-WAY DISK PLOW
Filed Dec. 2, 1948 3 Sheets-Sheet 2
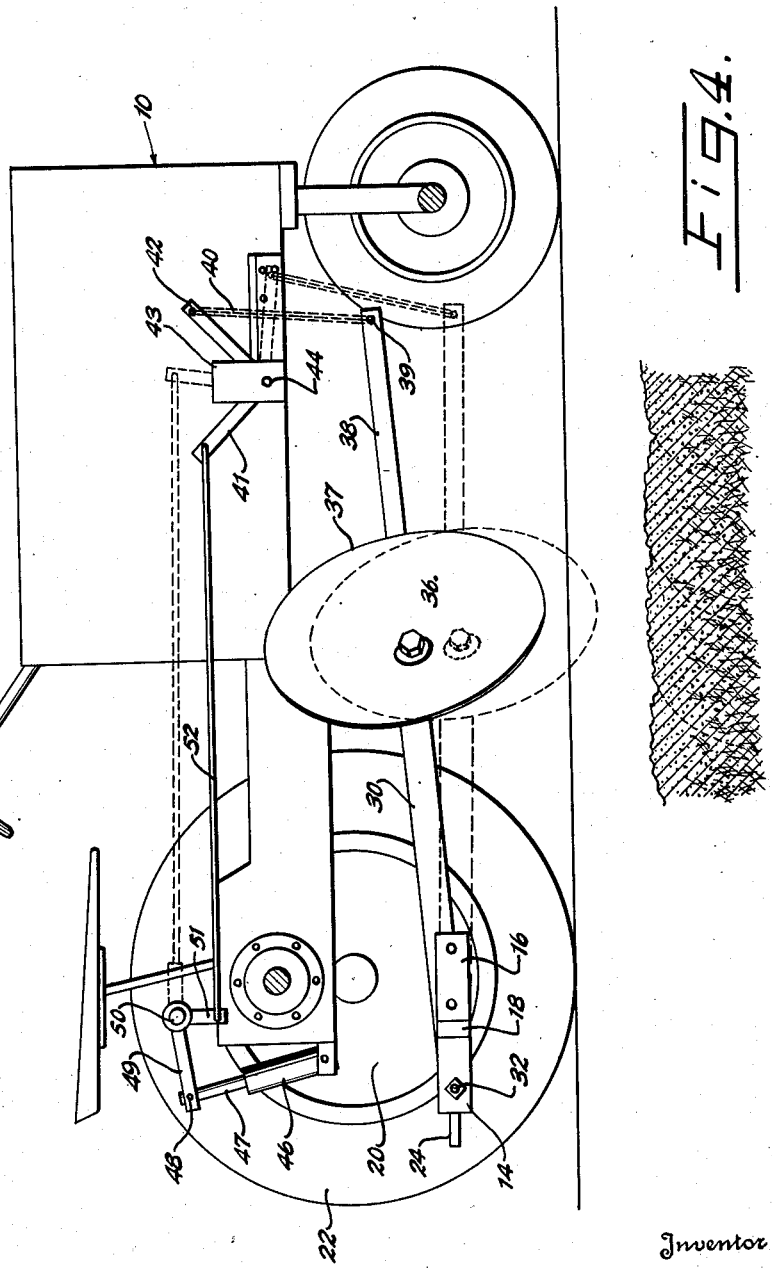
Inventor
Levi C. Hester
ATTORNEYS

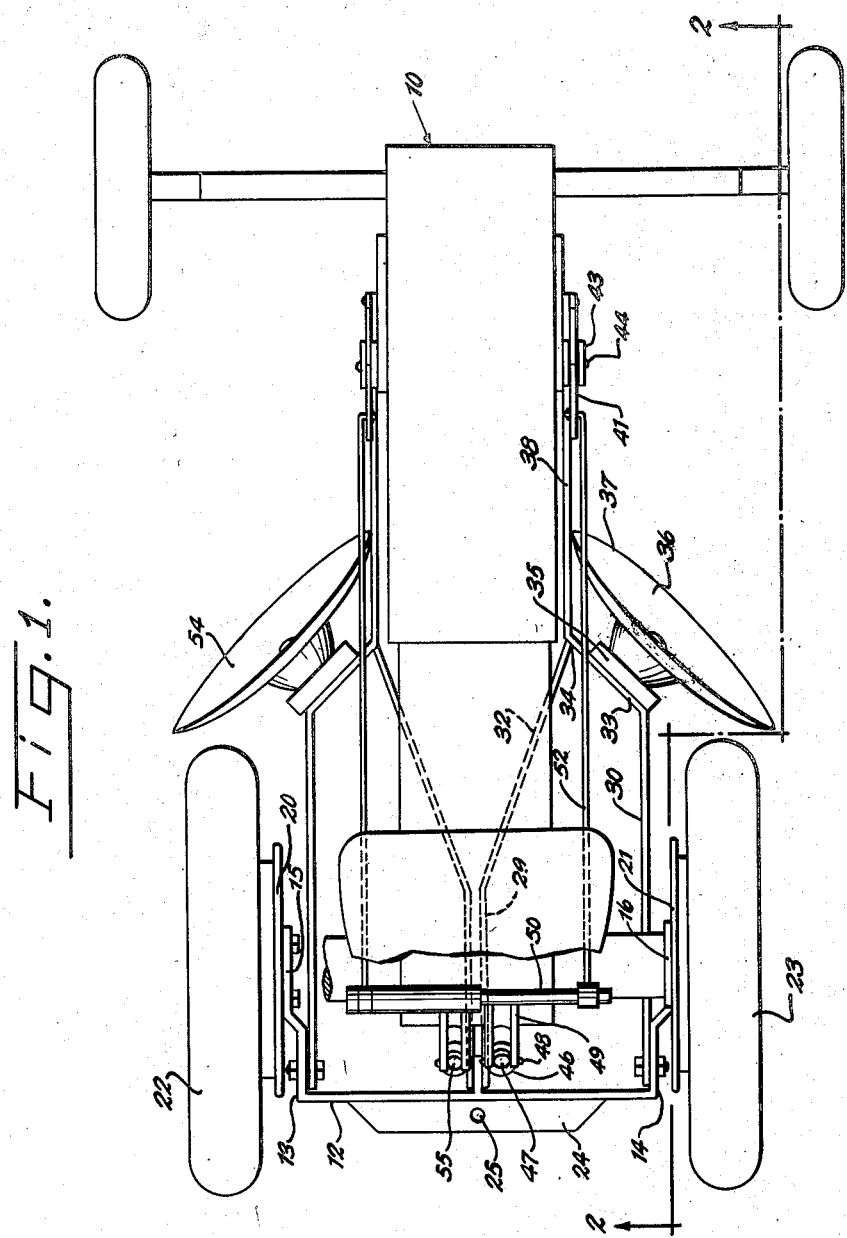

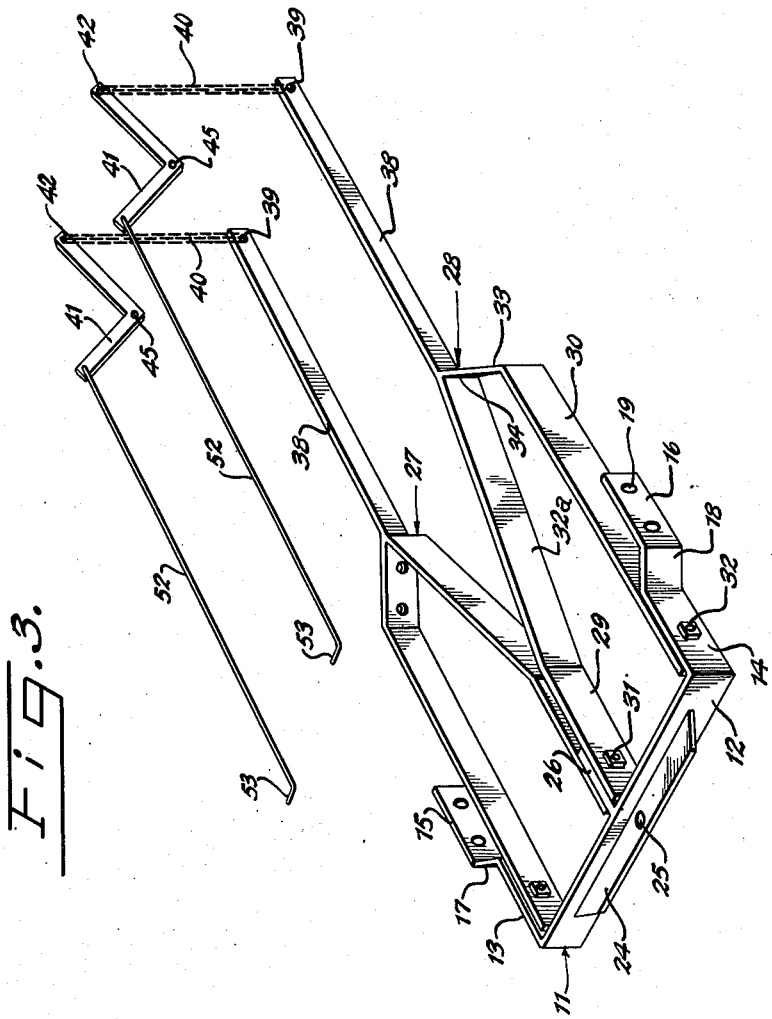

Patented Mar. 31, 1953

2,633,066

UNITED STATES PATENT OFFICE 2,633,066

TWO-WAY DISK PLOW

Levi C. Hester, Jacksonville, Fla.; Eythel J. Richardson, executrix of said Levi C. Hester, deceased, assignor to Hester Plow Co., Inc., Jacksonville, Fla., a corporation of Florida Application December 2, 1948, Serial No. 63,178

3 Claims. (Cl. 97—29)

My present invention relates to plows and more particularly to a two-way disc side plow for use with tractors of the type commonly used in agricultural and construction work.

An object of my invention is the provision of a disc plow assembly whereby the turned soil in successive furrows is deposited so as to have a substantially smooth and flat surface across a field thus obviating the necessity of subsequent harrowing the plowed area.

Another object of my invention is to provide a disc plow on each side of a tractor, the two being independently controllable to permit unidirectional displacement of the soil of each traversing cut made by the tractor and its plow assembly.

A further object of this invention is the provision of a disc plow frame which may be readily attached to the chassis of a tractor and which contains independently movable plow-carrying segments adapted to be selectively actuated by means of the hydraulic power take-off of the tractor.

Still another object of my present invention is to produce a disc plow assembly with which a field may be completely plowed without resultant furrows edging or traversing the area as a starting point for soil erosion.

Still other objects and advantages will become apparent from the following description of the present invention illustrated in the accompanying drawings in which:

In the drawings:

Figure 1 is a plan view of my disc plow assembly mounted upon a conventional farm tractor.

Figure 2 is a side elevational view of the tractor and plow assembly.

Figure 3 is a perspective view of a disc plow frame which forms a part of my invention.

Figure 4 is a sectional plan view of the surface soil of a field which has been plowed in accordance with the practice developed in the use of a two-way plow embodying my invention.

Similar reference characters in the several drawings indicate similar parts.

At the present time the conventional use of side disc plows in connection with farm tractors is to locate the plowing discs in staggered relation at one side of the tractor, usually the right hand side. This method of mounting presents an arrangement whereby the cutting disc or discs constantly throw the severed layer or layers of soil to the right of the line of travel of the tractor. This turning over of the top soil is in the same direction as that which occurs in using a mold board form of plow. The disc penetrates the soil and turns it, leaving it more or less pulverized with the vegetation evenly distributed from top to bottom.

It is seen, therefore, that when a traversing system of plowing is employed each return trip of the plow across the field the overturned soil will again be thrown to the right and deposited in a mound remote from its companion mound formed by the passing of the plow on the preceding traverse of the field in the opposite direction. Since this disassociation of the mounds is repeated with each trip the completed field presents a final pattern of successive transverse mounds and alternate ditches. Consequently unless there is a purpose in ditching a field the common practice in plowing is to cut a continuous furrow completely around a field in a succession of overlapping or parallel furrow turns resulting in a spiral, so to speak, which ultimately ends at the center of the field. At the center of the field there then necessarily exists between the last two laps of the spiral spaced adjacent mounds caused by throwing the earth in opposite directions thus creating a ditch between them, the direction and overall length of which is determined by the shape of the perimeter of the field.

In transverse plowing any attempt by the operator of the conventional plow assembly, either mold board or disc, to obtain a unidirectional throw of the earth to obviate ditching could be accomplished only by raising the plowing instrument from operation on each return traverse of the the field. Naturally such practice is impractical since working time, operational cost and wear on the vehicle are all greatly increased. Obviously, these ditches encourage and assist soil erosion.

In answer to the foregoing problem, I have devised a means for independently operating disc plows located on each side of a tractor in order to permit the operator to use a traversing system of plowing and at the same time successively use right and left hand plowing discs to constantly throw the severed soil in a single direction. This allows an overlapping of the soil mounds to insure a smooth surface free from the need of subsequent harrowing.

In carrying out my invention I employ two similar disc carrying frames underslung beneath the right and left hand sides of a tractor with means for independently adjusting them, said frames being each shaped to support a disc in a position beyond the respective side of the tractor and ahead of the corresponding drive wheel. The two discs rotate on axes lying in planes diverging with respect to the forward movement of the travel. Hence the discs face outwardly and forwardly at the respective sides of the tractor and depending upon the direction of travel of the vehicle and working adjustment of their respective frames the earth may be turned over in the same direction in any number of parallel furrows.

In Figs. 1 and 2 of the drawings, I have shown my two-way plow assembly attached to a conventional farm tractor 10. At the rear of the tractor I provide a U-shaped frame support bracket 11 consisting of a transverse base plate 12 and longitudinal arms 13 and 14 respectively formed at the left and right ends of the base plate. As best seen in Fig. 3 the forward ends of the arms are offset, as at 15 and 16, and connected with their respective arms by the oblique sections 17 and 18. Each of the offset portions 15 and 16 is provided with a pair of apertures 19 for bolting the support to the gear housings 20 and 21 of the left and right rear wheels 22 and 23. The rearward face of the base plate 12 is provided with a horizontal flange 24 containing a central aperture 25 therein to facilitate connection of any implements which it occasionally might be desired to be hitched to the tractor. On the forward face of plate 12 is centered a short vertical flange 26 the purpose of which will be later explained.

The remainder of the plow frame, as will be seen from Fig. 3, consists of a pair of forked disc-carrying segments 27 and 28. The segments are reversely similar in construction and for the purposes of explanation the features of segment 28 will be described in detail.

Segment 28 contains parallel legs 29 and 30 of unequal length. The leg 29 is the shorter of the two and is pivotally connected to the central flange 26 of the support by a bolt assembly 31. The longer leg 30 defines the outer extremity of the segment and is pivotally attached to the supporting arm 14 by means of the bolt assembly 32. Converging extensions 32a and 33 are formed at the forward ends of legs 29 and 30 respectively and meet to form a crotch 34.

The extension 33 is provided with apertures to permit the attachment of a disc box bearing housing 35 in which is journaled a concave plow disc 36 having a cutting rim 37. Extension 33 is formed at a predetermined proper inclination to afford maximum cutting efficiency on the part of the disc 36.

Projecting longitudinally from the crotch 34 is a tongue or arm 38 of less depth than the above described bifurcated portion of the segment 28. The end of the tongue 38 contains an aperture through which a bolt 39 passes for connecting the tongue to a lift chain 40. The chain 40 is in turn coupled with an L-shaped lift arm 41 by means of a bolt 42 located at the free end of the forwardmost section of the arm. A bracket 43 is secured to the chassis of the tractor and carries a pivot pin 44 which passes through a central opening 45 of the lift arm to support the arm for free oscillatory movement.

The oscillation of the lift arm is conveniently effected by the use of the conventional hydraulic power take-off 46 situated at the rear of the tractor and which is readily controlled by the tractor operator. The piston rod 47 of the power take-off is pin-connected as at 48 to a bifurcated actuator arm 49 projecting rearwardly from the toggle shaft 50. A second arm 51 (shown in Fig. 2) is driven by the toggle shaft 50 and is linked to the lift arm 41 through a connecting rod 52. The securing means at each end of the rod 52 may be any conventional journalling arrangement such as the right angle finger 53 passing through a receiving aperture in the arm and which may be secured in place by a retaining cotter pin (not shown).

From the description of the foregoing series of connecting elements it will be seen that, when put in motion by the operator, the hydraulic power take-off of the tractor will act to raise or lower the frame segment 28 and consequently its plow disc 36.

From Fig. 3 it becomes obvious that the segment 27 of the plow frame is similar in construction to the above described segment 28, but having reverse fabrication of elements to accommodate a position on the left side of the tractor 10. The segment 27 is likewise pivotally connected to the support 11 through the projecting flanges 13 and 26 of the support. A plow disc 54 is carried by the left hand segment and may be independently operated by a second hydraulic power take-off means 55 adjacent the power take-off 46 previously mentioned and comprising an oscillatory sleeve 50a carried on shaft 50.

In the operation of the device, the tractor operator actuates a selected hydraulic power take-off, the piston rod of which rises to rotate the toggle shaft and thrust the connecting rod 52 forward. This forward motion of the connecting rod pivots the lift arm 41 and lowers the chain 40. The attached frame segment is thus lowered until its plow disc reaches a desired cutting depth. If the right hand disc is thus lowered for the first traverse of the field, it will be obvious that the soil severed during the trip will be thrown to the right of the tractor. As the tractor reaches the far end of the field the operator actuates the respective power-take-off assemblies to raise from operation the right hand disc and lower the left disc for use on the return traverse. The soil disengaged by this disc will be thrown to the left of the tractor or toward the same side of the field as the initial "cut" was thrown. This permits adjacent successive parallel piling of the earth mounds with a slight overlapping and as a result obviates any possibility of the presence of a separating ditching furrow between the mounds.

With the completion of the return traverse, the disc positions are reversed and the right hand disc in once more put to use. This alternating operation of the discs is repeated with each traversing cycle of the tractor until the entire field is plowed.

From the foregoing description of my invention it will be seen that by attaching independently operable frame segments to the chassis of a tractor and by securing plow discs to each of the frames, I have provided a two-way side disc plow which may be used to effectively till the soil of an area leaving the same in a smooth and even condition. With an alternating use of each of my side plows the throw of the severed soil will be unidirectional thereby preventing the formation of ditches or furrows which aid in soil erosion.

A two-way plow such as herein disclosed allows each traverse of the field by the tractor to be a cutting run and presents a completed job which obviates the necessity of subsequent harrowing. Each of these features of performance are effective in the reduction of the time and expense of plowing operations.

The entire plow assembly incorporated in my present invention is characterized by a simplicity and durability of structure which affords rapid adaptation and prolonged operation in addition to essential economy of manufacture.

While a preferred form of the invention has been shown and described, it will be understood that variation in details of form may be made without departure from the invention as defined in the appended claims.

I claim:

1. In a farm tractor having a pair of rear drive wheels connected by an axle and gear housing, a bracket comprising a transverse plate having longitudinally extending arms for connecting to said gear housings and a longitudinally extending flange intermediate said arms, said bracket being so constructed that said arms are connected to said gear housings immediately adjacent the wheels, and said flange is disposed along the longitudinal center line of said tractor when said bracket is mounted on said tractor, a disc-carrying segment comprising spaced parallel extending legs having converging extensions, one of said extensions having plow-receiving means, and an arm extending forwardly from said extensions at the place of convergence thereof, one of said legs of the segment being pivotally connected to one of said arms of said bracket, the other leg of the segment being pivotally connected to said flange.

2. In a farm tractor having a pair of rear drive wheels connected by an axle and gear housings, a bracket comprising a transverse plate having longitudinally extending arms for connecting to said gear housings and a longitudinally extending flange intermediate said arms, said bracket being so constructed that said arms are connected to said gear housings immediately adjacent the wheels, and said flange is disposed along the longitudinal center line of said tractor when said bracket is mounted on said tractor, a pair of independently vertically adjustable disc-carrying frames, each having spaced parallel extending legs, one of said legs of each of said frames being pivotally connected to said flange, the other legs of each of said frames being in spaced relation to each other and pivotally connected to the arms of said bracket.

3. In a farm tractor having a pair of rear drive wheels connected by an axle and gear housings, a bracket comprising a transverse plate having longitudinally extending arms for connecting to said gear housings and a longitudinally extending flange intermediate said arms, said bracket being so constructed that said arms are connected to said gear housings immediately adjacent the wheels, and said flange is disposed along the longitudinal center line of said tractor when said bracket is mounted on said tractor, a pair of independent vertically adjustable disc-carrying segments, each of said segments comprising spaced parallel extending legs having converging extensions, one of said extensions having plow receiving means, and an arm extending forwardly from said extensions at the place of convergence thereof and adapted for connection to a lifting means, one of said legs of each of said segments being pivotally connected to said flange by a common pivot means, the other legs of each of said segments being in spaced relation to each other and pivotally connected to the arms of said bracket.

LEVI C. HESTER.

REFERENCES CITED

The following references are of record in the file of this patent:

UNITED STATES PATENTS

| Number | Name | Date |
|---|---|---|
| Re. 22,471 | Hollis | Apr. 18, 1944 |
| 1,053,485 | Edwards | Feb. 18, 1913 |
| 1,361,638 | Stephenson | Dec. 7, 1920 |
| 1,456,819 | Morton | May 29, 1923 |
| 1,614,674 | Hester | Jan. 18, 1927 |
| 1,774,008 | Hester | Aug. 26, 1930 |
| 1,873,749 | Flanagan | Aug. 23, 1932 |
| 2,041,832 | Hester | May 26, 1936 |